Patented Dec. 30, 1941

2,268,160

UNITED STATES PATENT OFFICE 2,268,160

SPONGY SUPERPOLYMER

John B. Miles, Greenville, Del., assignor to E. I. du Pont de Nemours & Company, Wilmington, Del., a corporation of Delaware No Drawing. Application June 21, 1939, Serial No. 280,400

2 Claims. (Cl. 260—78)

This invention relates to new products and articles of manufacture, and more particularly to synthetic cellular or spongy materials.

The artificial spongy articles most commonly manufactured are those made from rubber, cellulosic materials and resins. In general these articles are prepared for uses analogous to those of natural sponge. Materials capable of being formed into useful porous or spongy articles are relatively few, and in many instances the physical properties of the spongy products heretofore proposed have prevented their application to fields where the use of spongy material of the required properties would be desirable. These products are in many instances characterized by a low degree of uniformity in cellular structure. Another defect is more or less rapid deterioration; for example, rubber deteriorates from oxidation. Cellulose sponges, on the other hand, absorb too much water to be applicable for certain uses. Resinous materials such as polystyrene do not have sharp melting points, but soften over a considerable temperature range which causes difficulty in obtaining rapid setting to a completely uniform product. Polystyrene is also deficient in resiliency and strength. There is the further danger in the case of resins that depolymerization may occur in maintaining them at the elevated temperatures required for the manufacture of the cellular products. The synthetic porous articles obtained from resins also tend to lose their form at relatively low temperatures and are not useful over as wide a temperature range as would be desired.

This invention has as an object the preparation of new and improved multicellular materials. A further object is the preparation of multicellular materials which have great resilience, strength, toughness, and resistance to deterioration, and which maintain their form over a wide temperature range. A further object is the manufacture of cellular, spongy or porous products having a uniform multicellular structure. A still further object is the preparation of multicellular sheet materials which are useful as leather substitutes. Other objects will appear hereinafter.

These objects are accomplished, as more fully described hereinafter, by the production of a new and improved multicellular or spongy material which comprises essentially a synthetic, fiber-forming, crystalline, linear polymer.

I have found that in spite of the crystalline character of these polymers they can be successfully converted into products of uniform spongy structure made up of minute cellules, and that the cellular articles thus obtained possess advantages and properties not present in the spongy materials heretofore produced.

Typical synthetic, fiber-forming, crystalline, linear polymers and their preparation are described in U. S. Patents 2,071,250, 2,071,253, and 2,130,948. These polymers, which may be referred to as superpolymers, are crystalline rather than resinous and are linear or long chain products of high molecular weight. They are obtainable from bifunctional reactants, as for instance, from the reaction of diamines and dicarboxylic acids; the self-polymerization of monoaminomonocarboxylic acids or their amide-forming derivatives, e. g. the lactams; and from other reactants, referred to later, which yield like high molecular weight, linear, fiber-forming, crystalline polymers. Among the most useful polymers for the purposes of this invention are the polyamides which, as defined herein, include in addition to the polyamides obtained solely from polyamide-forming reactants the linear polymers containing as an integral part of the main chain of atoms in the molecule recurring amide groups, as for instance the ester-amide interpolymers obtained by including other bifunctional reactants with the polyamide-forming reactants. The microcrystalline nature of the fiber-forming linear polymers is evidenced by their sharp melting points and by the type of diffraction pattern which they furnish on X-ray examination. The term "fiber-forming" refers to the property of these polymers of yielding filaments, as by extrusion of the molten polymer, which upon cold drawing are formed into fibers which show by characteristic X-ray diffraction patterns orientation along the fiber axis. Upon hydrolysis with mineral acids the polyamides yield monomeric amide-forming reactants. For example, a polyamide derived from a diamine and a dibasic carboxylic acid yields on hydrolysis with hydrochloric acid the dibasic carboxylic acid and the diamine hydrochloride. Polyamides having an intrinsic viscosity of at least 0.4, and preferably between 0.5 and 2.0, are most useful. Intrinsic viscosity is defined in U. S. Patent 2,130,948.

The preparation of the cellular products of this invention involves incorporating a cellule-forming agent with the above described polymers and activating the agent so that cellules are formed.

A preferred method of obtaining the spongy products of particularly high strength and resilience consists in melting ground or otherwise finely divided polymer while under pressure of an inert gas, such as carbon dioxide or nitrogen. A large number of fine gas bubbles are entrapped, forming cellules in the melt without the necessity of agitation. By a suitable choice of particle size and gas pressure it is possible to vary the density and pore size of the product. The molten polymer containing entrapped gas bubbles may then be extruded from a suitable orifice, for example in the form of a multicellular ribbon, or molded by forcing it into another vessel of the desired shape, or it may be hardened by cooling and subsequently cut into desired shapes and sizes. The products usually vary between 0.4 and 0.8 in apparent density.

It is also possible, though less preferred, to introduce a cellule-forming agent directly and uniformly into the massive molten superpolymer. The cellule-forming material may be a gas or vapor, which is introduced into the molten polymer under pressure. The term "vapor" is used here, in accordance with its accepted definition, to means the gaseous form of a material which is a liquid or solid at ordinary temperature and pressure. The boiling point at ordinary pressure of the material used to yield the vapor should be substantially below the temperature of the molten polymer into which it is introduced. The cellule-forming agent, i. e., the gas or vapor, is then activated to produce a multicellular product by a rapid reduction in pressure, effected, for example, by extruding the polymer from a vessel under pressure into the open atmosphere. The polymer may also be formed in the presence of the cellule-forming agent.

The following examples, in which quantities are stated in parts by weight, are illustrative of the methods which may be used for carrying out the invention.

Example I

An autoclave was charged with 400 parts of an interpolyamide, prepared from hexamethylene diammonium adipate and caprolactam in a ratio of 60:40, which had been ground to pass a 14-mesh screen. The air in the autoclave was replaced by carbon dioxide, the carbon dioxide pressure increased to 200 pounds/sq. in., and the autoclave heated to a temperature of 200° C. during the course of three hours, maintaining the gas pressure at 200-240 pounds/sq. in. The molten material was then extruded from the autoclave through a slit in the form of a multicellular sheet. The product had an average apparent density of 0.78 as compared with a density of about 1.1 for the original polymer, and was very pliable. The average diameter of the cells was about 0.2 mm. The product proved capable of transmitting water vapor more than four times as rapidly as an ordinary sheet of the same polymer of the same thickness and was more than five times as pliable, as measured in the Olsen stiffness tester described in Bulletin No. 11, plate 933 of the Tinius Olsen Company.

Example II

An autoclave was charged with 500 parts of interpolymer having the same chemical composition as that used in Example I and which had been ground to pass a 14-mesh screen. The air in the autoclave was replaced by nitrogen, the pressure increased to 165 pounds/sq. in., and the autoclave heated to a temperature of 210° C. during the course of about two hours, maintaining the gas pressure at 270-310 pounds/sq. in. The molten material was then extruded from the autoclave through a slit in the form of a multicellular sheet. The apparent density of the product was 0.75 as compared with a density of about 1.1 for the original polymer. The average diameter of the cells was about 0.2 mm. The product transmitted water vapor about 5 times as rapidly and was more than 5 times as pliable as an ordinary sheet of the same polymer having the same thickness.

Example III

Polyhexamethylene adipamide (5 parts) and water (7.5 parts) were heated together in a sealed vessel. Upon releasing the pressure when the temperature reached 220° C., an extremely light, fluffy, multicellular material resulted due to the sudden expansion of the water vapor dispersed throughout the polymer. The product had a bulk density of 0.028, as compared with a density of about 1.1 for the original polymer.

Example IV

Polyhexamethylene adipamide (15 parts) and liquid sulfur dioxide (10 parts) were heated in a closed container to 205° C. Upon opening the vessel, a light fluffy product was obtained which was much like pith in appearance except that it was uniform throughout. Microscopic examination revealed the presence of extremely thin walled cells. The bulk density of the product was 0.054.

Example V

An autoclave was charged with 1048 parts of hexamethylene diammonium adipate, 5.55 parts of adipic acid, and 187 parts of water, and heated to a temperature of 264° C. (melt temperature) during the course of two hours. The pressure indicated was 225 pounds/sq. in. During the next two hours, the temperature of the melt was raised to 277° C. Nitrogen pressure (160 pounds/sq. in.) was applied, and the product extruded through a valve from the autoclave as a multicellular material.

Another embodiment which is advantageous in many cases comprises combining a cellule-forming agent with the polymer without using pressure, and activating by means of heat:

Example VI

Filaments of polyhexamethylene sebacamide were soaked for two weeks in 95% ethyl alcohol, removed, placed in a vessel, and heated in an ultra-high frequency electric field by placing the vessel between the two plates of a condenser upon which was imposed a voltage of 2200 volts at 30 million cycles per second. A current of 0.4 ampere was found to flow under these conditions. Expansion of the filament began in 10-15 seconds and was complete in about one minute. The expanded filaments were multicellular and had a specific gravity of less than 1, as compared with 1.1 for the solid polymer.

Example VII

A film was flowed from a 25% solution of the interpolyamide of Example I in a solvent mixture consisting of chloroform and methanol in a 2:1 ratio by volume. After sufficient solvent had evaporated from the film to permit it to be handled, the film (0.018 inch in thickness) was pressed lightly between the plates of a hydraulic press heated to 160° C. The rapid expansion of the solvent still present within the film on releasing the pressure caused the film to expand to a light spongy product 0.18 inch thick containing extremely thin-walled cells.

In the methods of Examples VI and VII the cellule-forming agent should have a boiling point below the melting point of the polymer. Preferably the agent should be a readily volatile liquid.

A related but less preferred method is shown in the following example which involves the generation of the cellule-forming gas in situ by means of a readily decomposable material which may be mixed with the molten superpolymer or with a suitable solution of a superpolymer:

Example VIII

Ammonium nitrite (10 parts) was mixed with an equal quantity of a 25% solution of hexamethylene adipamide-decamethylene sebacamide interpolymer in butanol, and the mixture dried at a temperature of 110° C. The resulting product was porous, containing large, thick walled cells.

Still another useful procedure consists in the introduction of a soluble material, which may be an inorganic salt or an organic compound, into the superpolymer or the reactants which form the superpolymer, or a solution of the superpolymer, and subsequent removal of the soluble material by extraction with a solvent, which is not a solvent for the superpolymer, or by other suitable means:

Example IX

Dextrose (7 parts) was mixed with 5 parts of a 30% solution of hexamethylene adipamide-decamethylene sebacamide interpolymer in formic acid, giving a stiff, doughy mass. This material was treated with water to precipitate the polymer and the dextrose then removed by thorough extraction, first with cold and then with boiling water. The resulting product was tough and porous.

Example X

Seventy parts of polyhexamethylene adipamide, contained as 30% solution in formic acid, was well mixed with 105 parts of dextrose. The resulting pasty material was placed in a form and extracted with cold water for 12 hours to precipitate the polymer and remove a portion of the dextrose. The product was finally boiled with water for 6 hours. The apparent density of the multicellular product was 0.158.

Example XI

Polyhexamethylene adipamide was prepared containing approximately 10% sodium chloride (micropulverized through 0.5 mm. holes). After soaking in distilled water at room temperature, the polymer contained 0.11% sodium chloride. Microscopic examination at 100 diameters showed the presence of a multicellular structure, the cells being about 0.01-0.02 mm. in diameter.

Another method useful in preparing the multicellular products of the present invention consists in foaming a melt, solution or dispersion of the superpolymers, for example by mechanical agitation or blowing with a vapor or gas, and subsequently hardening by cooling, precipitating or coagulating to yield a multicellular product. It will be advantageous in some instances to add surface active agents to assist in the generation and retention of a stable foam and any of the known surface-active materials may be employed for this purpose.

In addition to the crystalline, synthetic linear superpolymers referred to in the examples, there may be mentioned as applicable to this invention the superpolyesters, superpolyanhydrides, superpolyacetals, superpolyethers, and the interpolymers described in the above mentioned patents. The polyamides include polymerized 6-aminocaproic acid, 9-aminononanoic acid, polyamide interpolymers such as hexamethylene adipamide-caprolactam interpolymer, the interpolymer from hexamethylene diammonium adipate and decamethylene diammonium sebacate, an interpolymer from hexamethylene diammonium adipate and hexamethylene diammonium sebacate, etc. Other useful polymers of this kind are the superpolyureas and superpolythioureas obtained from diamines and diisocyanates or diisothiocyanates or by other methods, and superpolyurethanes obtained from glycols and diisocyanates. Another type of crystalline, synthetic linear, fiber-forming polymer applicable to this invention by the methods pointed out above is the solid polymer from ethylene, described in U. S. Patent 2,153,553, obtained by polymerizing ethylene at high pressures.

The multicellular products of this invention may contain various modifying agents, as for instance pigments, fillers, etc. which may be added to the polymer or to the reactants forming the polymer. When increased flexibility is desired, the polymers may be modified with plasticizers such as o-hydroxy-diphenyl, di-phenylolpropane, various sulfonamides, etc. Resins, antioxidants, bactericides, water repellents, surface modifying agents, etc. may also be employed.

In the embodiments in which the pulverized superpolymer is melted under pressure of a gas or vapor, or a gas or vapor is introduced directly into the molten polymer under pressure, any material may be employed which is gaseous at the temperature of the molten polymer, and which does not react with it to any harmful extent under the conditions of use. Thus, there may be used nitrogen, hydrogen, helium, carbon dioxide, ammonia, water vapor, or the vapors of volatile organic compounds such as methyl or ethyl ether, a volatile alcohol, acetone, methyl ethyl ketone, dioxane, benzene, toluene, ligroin, petroleum ether, etc., or a material readily decomposable into gases, e. g. ammonium carbonate, ammonium nitrite, etc. It is particularly advantageous to use a material soluble in the polymer at the temperature and pressure used, since a homogeneous solution leads to an exceptionally uniform expanded product. Water vapor is especially desirable as a cellule-forming material.

In the embodiment comprising mixing a cellule-forming material with a superpolymer and subsequently removing the cellule-former by chemical or physical means, a large variety of substances may be used. In general, crystalline, synthetic, linear superpolymers are relatively chemically inert and hence numerous materials may be used as cellule-forming materials by mixing with the preformed polymers in addition to inorganic salts. As suitable examples of cellule-forming agents may be mentioned sodium chloride, sodium sulfate, calcium carbonate, sodium acetate, sodium formate, sodium benzoate, sodium fluoride, water-soluble organic materials such as urea, dextrose, sorbitol, sucrose, maltose, methyl oxalate, methyl tartrate, lactide, glycolic acid, resorcinol, etc. Various resins and polymeric materials may be used such as polystyrene, polyvinyl alcohol, polyvinyl acetate, polymethacrylic acid, interpolymers of maleic anhydride with unsaturated compounds, cellulose acetate, cellulose nitrate, methyl methacrylate, etc., and waxes such as beeswax, hydrogenated castor oil, Asiatic wax, etc. In mixing with the superpolymer-forming ingredients and subsequently forming the superpolymer, cellule-forming agents are avoided which will themselves interact with the superpolymer-forming ingredient. Extraction of the cellule-forming agent may be accomplished by a suitable solvent, depending upon the particular agent used, as for example, in the case of an acidic material, extraction with a base.

The gaseous, cellule-forming material may be mixed with the superpolymer in various ways. Compressed gases may be blown into the molten polymer by means of jets, or they may be stirred into the molten polymer by suitable agitation. Also, the cellule-forming material may be absorbed by the polymer, for example, by soaking in a solution.

Expansion of the impregnated polymer may occur in several ways. The preferred method consists in a rapid reduction in pressure under controlled conditions by an extrusion process, since by suitable variation of the shape and size of the extrusion nozzle the product may be shaped into any desired form prior to cooling. Free expansion, for example, by an explosion process, may also be useful in certain instances, and the multicellular product later may be cut or broken into the desired shape. It is also suitable to use a limited reduction in pressure, for example, by means of a movable piston, and subsequently solidify the polymer in this condition.

A particularly advantageous method of expanding the superpolymer after it has absorbed a cellule-forming material consists in heating in a high frequency electric field and thus generating the pore-forming gas in situ. This method of heating allows the polymer to be preformed into the desired final shape while in the massive state, for example, filaments, rods, etc., and subsequent conversion to a multicellular form without appreciable distortion. Other suitable methods of heating, for example, by passing over or pressing between heated plates or in molds, may also be used.

By a suitable choice of cellule-forming agents and methods of expansion it is possible to control the cell size and thus the density, resilience, and form stability of the products within wide limits and to produce materials of specific desired properties. For multicellular superpolymers of a given density, a smaller cell size leads to increased form stability and improved thermal insulating properties, whereas products of similar density but larger cells have a greater resiliency.

The cellules in the multicellular products may be of microscopic size, i. e. on the order of 0.1 mm. or less in diameter, or they may be as large as 1 cm. in diameter. However, it is preferred to have the cellules not larger than about 2 mm. in diameter. The density of the product will depend upon the particular superpolymer used and the size of the cellules, and may vary from somewhat less than the density of the polymer to 0.01 the density of the polymer. However, products having an apparent density in the range 0.80 to 0.01 are preferred since products of density greater than about 0.8 tend to be too rigid to show distinct advantages of resilience and insulating capacity over the massive polymers, and products of density less than about 0.01 lose form stability.

The products of this invention are characterized by great toughness, durability, and thermal stability, as well as chemical inertness and solvent resistance. They are unaffected by moisture, mold, and fungus growth, and are not subject to attack by vermin, termites, etc. The porous products are further characterized by low density, high strength, and excellent thermal insulating capacity, resiliency, and form stability over a wide temperature range. The resiliency of the multicellular products is particularly surprising in view of the essential rigidity of the superpolymers in the massive state.

An important advantage of the present invention is that it permits the introduction of solid or gaseous cellule-forming materials directly into the molten (liquid) polymer, thus providing excellent dispersion and hence an exceptional degree of uniformity in cellular structure. This is particularly true in those cases in which a gas soluble in the molten polymer is used as the cellule-forming agent. The polymers of the present invention, being crystalline, show sharp melting points, and thus a smaller temperature interval is required to set or harden the froth than is necessary in the case of, for example, polystyrene or other resinous materials. A further advantage is that products may be prepared of controlled density and rigidity whose properties may be varied to suit the specific use for which they are intended.

In the form of sheets the cellular products of this invention are particularly useful as leather substitutes. They are strong, pliable, and readily worked as required for many leather applications. Furthermore, as shown in Examples I and II, they possess to a very remarkable degree the breathing qualities which are characteristic of leather. For use as leather substitutes it is preferred to use products having an apparent density of 0.4 to 0.8, containing substantially spherical cellules which have an average diameter of about 0.2 mm. or less. Cellular products prepared from interpolymers, such as that derived from hexamethylene diammonium adipate and caprolactam, are particularly useful for this purpose.

The porous products of this invention are useful for electrical and heat insulating purposes, for example in containers for cold and hot foods and liquids. These products are also valuable for sound-proofing purposes and acoustic control. Because of their resilience, the spongy superpolymers described herein are useful for padding in seat cushions, as a packing material, and as a wadding material. They are also useful as a cork substitute.

As many apparently widely different embodiments of this invention may be made without departing from the spirit and scope thereof, it is to be understood that I do not limit myself to the specific embodiments thereof except as defined in the appended claims.

I claim:

1. A leather substitute comprising a polymer in the form of a cellular spongy pliable sheet material having an apparent density of from 0.4 to 0.8 and having a uniform cellular structure made up of small cells the average diameter of which is not larger than about 2 mm. and being capable of transmitting water vapor more than four times as rapidly as an ordinary sheet of the same polymer of like thickness, said polymer consisting essentially of the reaction product of a linear polymer-forming composition which comprises in substantial amount reacting material selected from at least one of the groups consisting of (a) monoaminomonocarboxylic acids, and (b) mixtures of diamine with dibasic carboxylic acid.

2. The leather substitute set forth in claim 1 in which said polymer is an interpolymer comprising the reaction product of hexamtheylene diamine, adipic acid, and caprolactam.

JOHN B. MILES.